United States Patent
Bondarenko et al.

(10) Patent No.: US 6,389,028 B1
(45) Date of Patent: May 14, 2002

(54) METHOD AND APPARATUS FOR PROVIDING ESTIMATED RESPONSE-WAIT-TIME DISPLAYS FOR DATA NETWORK-BASED INQUIRIES TO A COMMUNICATION CENTER

(75) Inventors: Oleg Bondarenko, San Francisco; Yuri Shtivelman, Belmont, both of CA (US)

(73) Assignee: Genesys Telecommunications Laboratories, Inc., San Francisco, CA (US)

(*) Notice: Subject to any disclaimer, the term of this patent is extended or adjusted under 35 U.S.C. 154(b) by 0 days.

(21) Appl. No.: 09/405,561

(22) Filed: Sep. 24, 1999

(51) Int. Cl.[7] .............................................. H04L 12/28
(52) U.S. Cl. ...................... 370/401; 370/352; 709/204
(58) Field of Search ................................ 370/401, 412, 370/252, 352, 270; 707/3, 10, 203, 5; 379/309, 266.06, 242, 267, 265.09, 93.17, 93.23; 709/206, 104, 219, 203, 204

(56) References Cited

U.S. PATENT DOCUMENTS

| | | | | |
|---|---|---|---|---|
| 5,812,668 A | * | 9/1998 | Weber | 705/79 |
| 5,956,483 A | * | 9/1999 | Grate et al. | 709/203 |
| 6,064,730 A | * | 5/2000 | Ginsberg | 379/265 |
| 6,157,655 A | * | 12/2000 | Shtivelman | 370/412 |
| 6,175,564 B1 | * | 1/2001 | Miloslavsky et al. | 370/352 |
| 6,188,673 B1 | * | 2/2001 | Bauer et al. | 370/252 |
| 6,212,178 B1 | * | 4/2001 | Beck et al. | 370/352 |
| 6,256,623 B1 | * | 7/2001 | Jones | 707/3 |
| 6,321,251 B1 | * | 11/2001 | Deisinger et al. | 709/203 |
| 6,332,154 B2 | * | 12/2001 | Beck et al. | 709/204 |

* cited by examiner

Primary Examiner—Kwang Bin Yao
Assistant Examiner—Prenell Jones
(74) Attorney, Agent, or Firm—Donald R. Boys; Central Coast Patent Agency, Inc.

(57) ABSTRACT

An Estimated Wait Time (EWT) service for a Web page provider has an internet-connected facility for monitoring communication status with a communication center having communication equipment hosting agents of the web page provider, and an interactive link in a web page hosted by the Web page provider. The interactive link is presented to a user accessing the Web page, and when selected, connects the user to the facility for monitoring communication status. In a preferred embodiment the facility provides a Web page display for the user, displaying parameters regarding the communication status, such as estimated wait time (EWT). In some cases there are options in a user interface for placing an Internet Phone (IP) call, for sending a message, and e-mail, and so forth, or for requesting a call back. In the case of a cal back the user may, in some embodiments, provide alternative numbers or addresses and times for call back.

7 Claims, 3 Drawing Sheets

METHOD AND APPARATUS FOR PROVIDING ESTIMATED RESPONSE-WAIT-TIME DISPLAYS FOR DATA NETWORK-BASED INQUIRIES TO A COMMUNICATION CENTER

FIELD OF THE INVENTION

The present invention is in the field of computer-telephony-integration (CTI) including Internet Protocol Network Telephony (IPNT) and has particular application to methods and apparatus for informing network-based callers of estimated waiting time for call backs from agents working in communication centers.

BACKGROUND OF THE INVENTION

Telephones are one of the most widely-used communication tools in the world. At early stages in development, telephones were merely a convenient tool to allow people to communicate while they are physically separated. At the present time, however, many organizations use telephones to market products and services, provide technical support to customers, allow customers to access their own financial data, and much, much more. Thus, telephone systems have become a widely used major business and marketing tool.

Telephony call centers have been developed in order to bring about effective use of the telephone system for business and marketing purposes. In a call center, typically a relatively large number of agents handle telephone communication with clients. A typical call center has at least a telephone switching apparatus, such as a PBX, which has a trunk for incoming calls and station-side ports for connecting to agent's telephones. The switching apparatus may be an Automatic Call Distributor (ACD), distributing calls to agents as they become available, or the switching apparatus may be controlled by a connected processor in what is known in the art as a Computer Telephony Integration (CTI) system. The matching of calls between clients and agents is typically performed by software.

A simple example is used here to describe a few of the many advantages of call centers. When a call is made to a call center, the telephone number of the calling line is made available to the call center by a telephone carrier. Based on this data, software in the call center can access a database server to obtain information about the client placing the call. The software can now route the call to an agent who can best handle the call based on predefined criteria (e.g., language skill, knowledge of products the customer bought, etc.). Such a system uses a method known to the inventor as skill-based routing. In some cases the software may immediately transfer relevant information about the client to a computer screen used by the agent (screen pop). Thus, the agent can gain valuable information about the client prior to receiving the actual call. As a result, the agent can more effectively handle the telephone transaction.

In recent years, advances in computer technology, telephony equipment, and infrastructure have provided many opportunities for improving telephone service in publicly switched and private telephone intelligent networks. Similarly, development of separate information and data network known as the Internet, together with advances in computer hardware and software have led to a new multi-media telephone system known in the art as Internet Protocol Network Telephony (IPNT). In IPNT calls are handled directly between computers over a digital network, and voice data is packaged as data packets.

Under ideal circumstances IPNT telephony has all the quality of conventional public and private telephone intelligent networks, and many advantages accruing from the aspect of direct computer-to-computer linking. Circumstances re: the Internet are, however, often less than ideal, and bandwidth limitations typically lead to delay and interruption of voice communications. Video calls using such as the Internet rather than conventional telephony networks with dedicated bandwidth are even less efficient because higher bandwidth is required. Still, even given these realities, In IPNT as well as in the older intelligent and CTI-enhanced telephony systems, both privately and publicly switched, it is desirable to handle more calls faster and to provide improved service to customers in every way.

As Computer Telephony Integration (CTI) systems become more sophisticated, and multimedia communication becomes more pervasive, increasingly sophisticated call centers are being developed wherein multimedia communication of many sorts is used by agents in addition to conventional telephony techniques. Companies are developing multimedia communication methods and are beginning to integrate these methods within the call center environment. These developments have produced a new breed of multimedia agent to handle communication with the aid of advanced software-communications programs. Agents within call centers who once handled only telephone communications are now required to handle a variety of communications such as, but not limited to E-mail, Video mail, Video calls, and data network calls such as Internet protocol telephony (IPT) calls.

It can be appreciated then, that a multimedia agent for purposes of this specification is an agent in a call center charged with handling various communications transactions, and who has access to multi-communication mediums, hence, the term multimedia. A multimedia agent may work in a call center set up for technical service, sales, management, or for any other purpose for which call centers are used.

As described above, many of the newer mediums of communication that may be employed by a multimedia agent involve some type of computer integration. The term communication center, rather than the term call center more accurately reflects the added computer hardware and software capabilities available to today's call-in center. Therefore, the term communication center will be used to replace the term call center hereinafter in this specification.

In such communication centers, agents are typically provided with computerized workstations, including a computer, which may be a personal computer, and a video display unit, hereinafter termed a PC/VDU. In communication centers known to the present inventor, the agents' PC/VDUs are interconnected on a local area network (LAN), which may also connect to one or more processors in turn connected to a telephony switch to which the agent's telephones are connected. Through sophisticated computer techniques integrated with the requisite hardware, multimedia capability for the agents is achieved.

A multimedia agent working in a communication center such as described above is assigned to a workstation as described, and the workstation, together with software accessible on the LAN presents graphic user interfaces (GUIs) for displaying information relating to each communication transaction handled by that particular agent. For example, along with normal phone capabilities, the agent may be capable of sending and receiving E-mail, Video mail, and the like. Video conferencing may also be a part of an agent's transaction protocol. Similarly, a caller to such an agent may have a PC connected on-line, or to a network accessible to the agents, and thus be enabled to send and receive E-mail, video calls, or any other multimedia communication that the agent may host. As well, callers may be accessing the agent from a normal analog telephone where only voice mail capabilities and conventional telephony audio services are utilized.

Call routing to and within communication centers involves computerized platforms and software dedicated to directing a caller to an appropriate agent for the purpose of fulfilling the purpose of the caller. This type of call routing is known to the present inventors as agent-level call routing. Routing of calls, then, may be on several levels. Pre-routing may be done at Service Control Points (SCPs) and further routing may be, and typically is, accomplished at individual call centers.

As described above, multimedia communication methods are emerging as applicable methods of communication within communication centers. For example, E-mail programs, video calls, IPT calls, and the like can be utilized by agents in addition to voice mail and more conventional telephony connections. In many cases, agents are continually connected to such as the Internet for the purpose of contacting or responding to many Internet-sourced inquiries that come in from customers looking at Web-based advertisements hosted by the communication center or associated enterprise.

Aside from V-mails and e-mails, customers may wish to connect to a specific live agent via IPNT conventions. However, due to the nature of the connection (shared bandwidth), a customer cannot wait for a connection. If the agent called is not available at the time of the incoming IPNT call, then the customer must typically send an e-mail or the like requesting a response. If an IPNT queue shared by several agents is in effect at the communication center, the chance for a real-time connection increases, however, it is not guaranteed. Keeping many IPNT users in a queue is a drain on precious bandwidth resources. Moreover, most IPNT applications impose a connection time-out wherein if no agent is immediately available, then a simple busy notification is transmitted back to the calling party. In current art, the customer has no way of knowing when the agent may be available to respond.

What is clearly needed is a method and apparatus for informing IPNT callers calling into a communication center as to an accurate time estimate that a responding agent will call back. Such a method and apparatus may be provided to interface with callers either at the time of a call attempt, or even before a call attempt has been made. Moreover, much unnecessary use of bandwidth resulting from many IPNT callers held in a queue or otherwise attempting to forge a connection may be prevented.

SUMMARY OF THE INVENTION

In a preferred embodiment of the present invention a system for informing a user visiting an enterprise-hosted WEB page at a Web site on the Internet, the Web page including at least one hyperlink for requesting or initiating communication with an agent representing the enterprise, of parameters related to the communication is provided, the system comprising an internet-connected facility for monitoring communication status with a communication center having communication equipment hosting enterprise agents; and a user interface in the enterprise-hosted web page for accessing the monitoring facility and displaying parameters of the communication status. By accessing the monitoring facility through the user interface the communication status is displayed to the user.

In preferred embodiments the user interface comprises a hyperlink to a universal resource locator (URL) providing a Web page including the communication status, which preferably comprises estimated wait time (EWT) in at least one communication queue for communication with an enterprise agent. There may also be a call hyperlink, which when selected places an Internet-protocol network telephony (IPNT) call to the communication center on behalf of the user. Selecting the call hyperlink placing the IPNT call to the communication center may also invoke the URL for the web page including the communication status.

In some embodiments the user interface comprises optional interactive links for the user to select and initiate alternative media communication with enterprise agents at the communication center, including one or more of voice message, e-mail, or request for call back. A request for call back may include a facility for the user to specify one of both of a telephony number or address and a time for the call back to be made.

In another aspect of the invention an Estimated Wait Time (EWT) service for a Web page provider is provided, comprising an internet-connected facility for monitoring communication status with a communication center having communication equipment hosting agents of the web page provider; and an interactive link in a web page hosted by the Web page provider, the interactive link presented to a user accessing the Web page, and when selected, connecting the user to the facility for monitoring communication status. In a preferred embodiment the Web page having the hyperlink further comprises a user interface enabled to display parameters of the communication status, and the communication status includes estimated wait time (EWT) in at least one communication queue at the communication center for communication with an enterprise agent.

In preferred embodiments of the service the user interface comprises a call hyperlink, which when selected places an Internet-protocol network telephony (IPNT) call to the communication center on behalf of the user, and invoking the call hyperlink also invokes the URL for the web page including the communication status. There may be optional interactive links for the user to select and initiate alternative media communication with enterprise agents at the communication center, including one or more of voice message, e-mail, or request for call back. The request for call back may include a facility for the user to specify one of both of a telephony number or address and a time for the call back to be made.

In yet another aspect of the invention a system for establishing and managing communication between a user accessing a Web page on an Internet site and agents of an enterprise hosting the Web page is provided, comprising a communication center having equipment facilitating the agents; an Internet-connected facility for monitoring communication status with the communication center; and a Web site hosting the Web page and having a link to the monitoring facility. Linking to the monitoring facility causes the communication status to be displayed to the user. In this system, in a preferred embodiment, a user interface is provided including the hyperlink and options including initiating an IPNT call to the communication center. The communication status preferably includes at a minimum estimated wait time (EWT) in at least one communication queue for communication with an enterprise agent.

In some embodiments of this system selecting the call hyperlink places the IPNT call to the communication center and also invokes the link for the web page including the communication status. Also the user interface may comprise optional interactive links for the user to select and initiate alternative media communication with enterprise agents at the communication center, including one or more of voice message, e-mail, or request for call back. The request for call back may include a facility for the user to specify one of both of a telephony number or address and a time for the call back to be made.

In another aspect of the invention a method for alerting a user accessing an enterprise-hosted Web page and desiring to communicate with an agent of the enterprise, of the estimated wait time for establishing said communication is provided, comprising the steps of: (a) monitoring status of access to agents of the enterprise at a communication center; (b) providing the access status to an Internet-connected monitoring server; and (c) providing a hyperlink in the Web page for connecting the user to the to Internet-connected monitoring server, invoking the hyperlink displaying parameters of the agent status to the user through the enterprise-hosted Web page.

In the various embodiments of the invention disclosed in enabling detail below, for the first time an estimated wait time (EWT) may be provided to users accessing enterprise-hosted Web pages on the Internet, when these users desire to establish communication with an agent of the enterprise.

BRIEF DESCRIPTION OF THE DRAWING FIGURES

DESCRIPTION OF THE PREFERRED EMBODIMENTS

Figure 1:
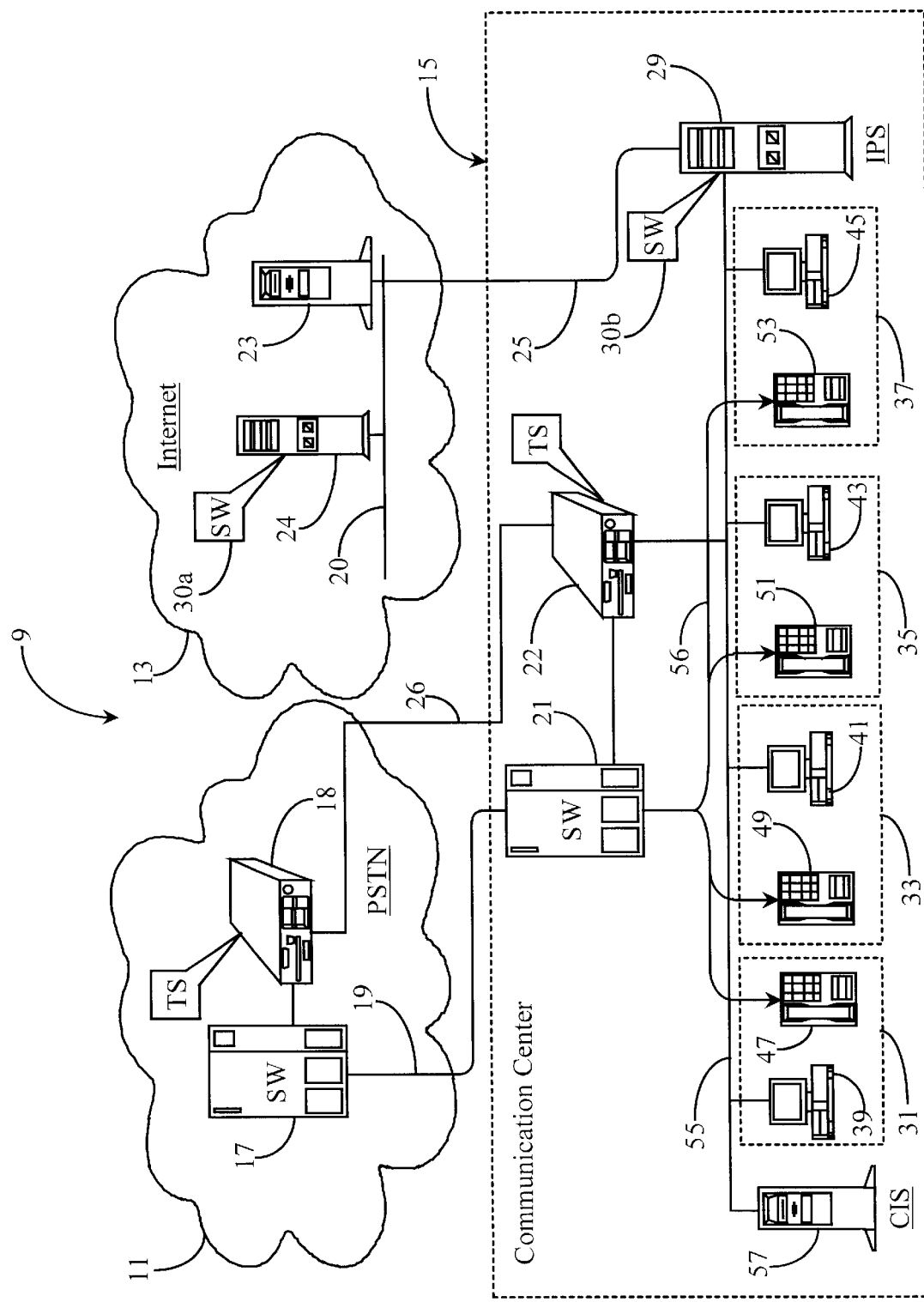
FIG. 1 is an over view of an IPNT-capable communication center practicing an estimated wait-time-display technique according to an embodiment of the present invention.

FIG. 1 is an over view of an IPNT-capable communication center 15 practicing an estimated wait-time-display technique according to an embodiment of the present invention. In FIG. 1 a telecommunications network 9 comprises a public-switched telephone network (PSTN) 11, the Internet network 13, and communication center 15. PSTN network 11 may be a private network rather than a public network, and Internet 13 may be another public or a private data-packet network as may be known in the art.

In this embodiment call center 15 is equipped to handle both conventional connection-oriented-switched-telephony (COST) calls and IPNT calls. Both COST calls and IPNT calls are delivered to communication center 15 by separate network connections. For COST calls a representative telephony switch 17 in PSTN 11 may receive incoming telephone calls from anywhere in PSTN 11 and rout them over a COST-network connection (telephony trunk) 19 to a central switching apparatus 21 located within communication center 15.

IPNT calls, as opposed to COST calls are, in a general sense, facilitated by network-connected servers adapted to make the connections. However, in this example, communication center 15 has an Internet Protocol Switch (IPS) 29 provided therein and adapted for receiving IPNT calls originating from any connected IP address in Internet 13. IPS 29 is also adapted to enable routing of such calls by push or pull technology to final destinations within communication center 15.

A Web server 23 is illustrated in Internet 13 and adapted as a typical Internet file server and one of many possible IPNT interfaces that may facilitate inquiries coming into communication center 15. Server 23 is illustrated as connected to an Internet backbone 20, which represents the many lines and connections interconnecting servers in Internet 13. In this example IPNT calls destined to communication center 15 from any connected IP address are initiated, in this case, from server 23 and routed over a data-network connection 25 IPS 29 located within call center 15.

It is not required that communication center 15 be adapted with both COST and IPNT equipment in order to practice the present invention. For example, communication center 15 may, in one embodiment, be adapted only for data-network telephony (DNT), of which IPNT is a subset, and any COST call connections thereto from such as PSTN 11 are accomplished with network bridging techniques (known to the inventor). The inventor simply deems that the "dual capable" embodiment represented herein by telecommunications network 9 is a flexible and multi-capable center which will support alternative descriptions of the present invention.

Communication center 15 further comprises four agent stations 31, 33, 35, and 37. Each of these agent stations, such as agent station 31, for example, comprises an agent's telephone 47 adapted for COST communication and an agent's PC/VDU 39 adapted for IPNT communication and additional data processing and viewing. Agent's telephones 49, 51, and 53 along with agent's PC/VDU 41, 43, and 45 are in similar arrangement in agent stations 33, 35, and 37 respectively. Agent's telephones, such as agent's telephone 49, are connected to central switching apparatus 21 by virtue of an internal COST wiring 56.

A LAN 55 is provided in communication center 15 and connects agent's PC/VDUs to one another and to IPS 29. A client-information-system (CIS) server 57 is connected to LAN 55 and provides additional stored information about callers to each LAN-connected agent. IPS 29 routes incoming IPNT calls to agent's PC/VDU's that are also LAN-connected as previously described. Specific Internet access and connectivity is not shown, as such is well known in the art, and may be accomplished in any one of several ways.

In addition to standard COST capability, a separate data network represented herein by a CTI processor 18, a CTI processor 22, and a connecting data-network 26 is provided and adapted to allow intelligent routing routines enabled by virtue of provided instances of T-server (TS) software (known to the inventor) to be applied both in communication center 15 and in PSTN network 11. For example, processor 18, running a TS routine, is provided at the network level (PSTN 11). Processor 18 is connected to telephony switch 17 by virtue of a CTI link. Processor 22, running a TS routine, is provided at agent level (communication center 15). Processor 22 is connected to central switch 21 by virtue of a CTI link and to LAN 55 by virtue of a LAN data-connection. TS software provides routing control over switch 17 in PSTN 11 and switch 21 in communication center 15.

Data network connection 26 is provided and adapted to connect processors 18 and 22 for the purpose of enabling transfer of data and control signals in routing of COST calls to center 15. The provided connection to LAN 55 enables data about callers to be routed to agents from PSTN 11 ahead of actual COST calls. The system immediately described above is known to the inventor and greatly enhances routing capability between PSTN 11 and agent's operating in communication center 15. The described system supports a concept known to the inventors as "agent level routing", which was briefly described in the background section. Furthermore, statistical based, availability based, and skill based routing routines may also be implemented through the separate data-network represented by processors 18, 22, and connection 26.

Each agent's PC/VDU, such as PC/VDU 45 has a connection via LAN 55 and data network connection 25 to Internet 13 while the assigned agent is logged on to the system, however, this is not specifically required to practice the present invention. Rather, it is preferred so that incoming IPNT calls may be routed efficiently. Dial-up connecting rather than a continuous connection to Internet 15 may sometimes be employed.

In a preferred embodiment of the present invention, a unique software capability is provided whereby IP callers may access the current and updated status of an agent or agent's IP queue and based upon user analysis, initiate an interaction that directs an agent's response. Such software is represented herein by a SW instance 30a provided to execute on a Web-server 24 in Internet 13, and a SW instance 30b provided to execute on such as IPS 29 within communication center 15.

Web server 24 is adapted to store and provide Web pages or information pages typically written in hypertext mark-up language (HTML). The pages in Web server 24 are software-enhanced during authoring to provide continually updated content about the status of agents operating in communication center 15 to users who are attempting to forge a connection with them.

SW 30b is adapted to facilitate and monitor a virtual IP queue or queues (not shown), and/or agent status, and to provide real-time data to WEB-server 24 about the number of and status of calls within each queue and waiting for each agent. SW 30b also provides estimated wait time (EWT) information for probable agent response on a continuous or periodic basis to WEB-server 24. SW 30a in some embodiments incorporates the streamed data to specific software containers operating in the above-described Web pages, thereby presenting an updated account to inquiring users.

In a simple embodiment, a user browsing enterprise-hosted Web pages in such as server 23 would encounter an interactive hyperlink (not shown) that is adapted to facilitate live communication with an agent or agents operating in communication center 15. Such Web pages containing the contact links would typically be in the form of interactive advertisements for products or services provided by an enterprise. The contact links offer communication between an invoking user and a hopefully available agent at center 15.

In one embodiment, by invoking a hyperlink in a Web page offering, for example, an immediate IPNT connection, a user is served an associated information Web page, enhanced via SW 30b, from server 24 while his IP call is routed over data connection 25 to IPS 29 in communication center 15. If no agent is available, the IP call is placed in a virtual queue. The information Web page from server 24 informs the user of the current status of the queue in which he or she has a virtual position. Status details include such as number of calls ahead of the user's call, estimated wait time before a response from an agent will likely be initiated, and so on.

In addition to status regarding the queue, additional interactive options may be presented on the status information page as media alternatives. For example, a user may be presented with options to elect to have a call back on a PSTN phone or a cell phone instead of an IP phone facility on his/her computer. Such a service is useful because perhaps a user will be away at the time of the expected call back. In that case a user may have the response forwarded to such as his cellular telephone. E-mail, Voice-mail, and other multi-media options are also available as long as they are supported at communication center 15.

It is not required that a user first make an attempt to call an agent on such as an IP application before he or she accesses a queue-status information page. A user may first access the information page and then send an instant message containing a directive for response with any supported media without making an attempt to contact an agent with an IP phone or other DNT communication applications. In this case the user's request would be queued according to the appropriate media.

It will be apparent to one with skill in the at that an estimated-wait-time (EWT) application such as described with respect to SW instances 30a and 30b may be integrated with multiple queues representing a same media or alternative media without departing from the spirit and scope of the present invention. For example, a status information-page may contain data about a virtual IP queue that is shared by a plurality of agents or about a plurality of such queues individual to particular agents. Moreover, real queues, shared or not, such as for e-mail, V-mail, fax requests, and so on may be included for status reporting on such an information page.

This exemplary embodiment describes the capability of the present invention with respect to IP communication only. This is in part because of the fact that in communication center 15, COST and IPNT calls arrive over separate networks and are handled by separate equipment groups utilizing separate software routines. However, in a communication center wherein a bridging technique is used to convert between COST calls and IPNT calls, the method and apparatus of the present invention, with some modification, may be used to interact with COST callers waiting to be connected at such as switch 17. In that case, interactive voice response (IVR) technology could be used to present queue status information and the like. More detail about queue monitoring and status reporting will be presented below.

In other embodiments interactive links on Web pages may offer COST call-back for enterprises having call centers not enhanced for DNT. In such cases there may be T-server such as T-Server 18 connected to Web server 24 by a CTI link and to T-Server 22 by a data link analogous to link 26. In this case an information Web page is provided displaying information regarding the status of agents and agent stations in call center 15 through monitoring COST telephones (47, 49, 51, 53) via switch 21, for example.

Figure 2:
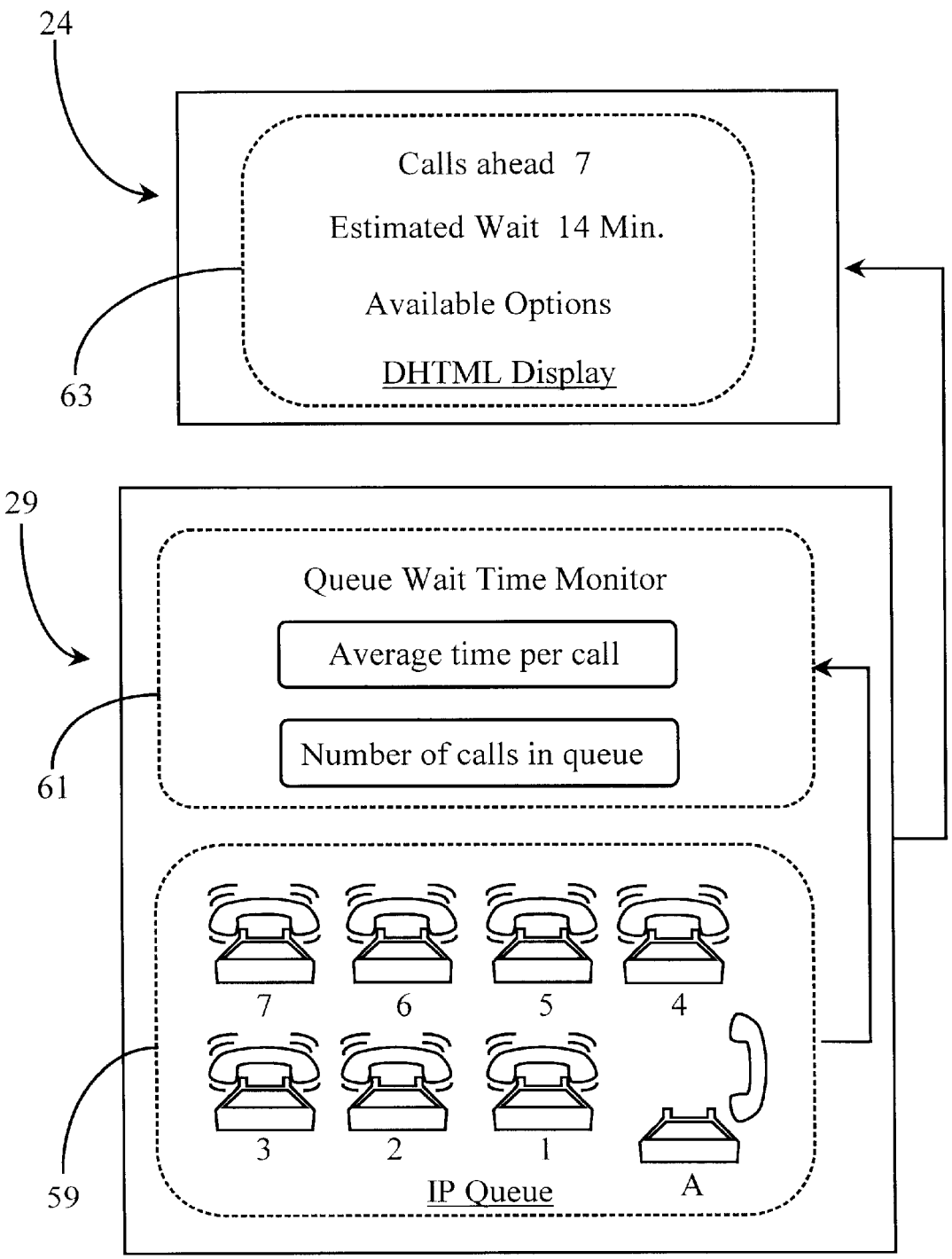
FIG. 2 is a block diagram illustrating a dynamic IPNT display-to-queue sever relationship that utilizes queue monitoring for updating estimated-wait-time displays according to an embodiment of the present invention.

FIG. 2 is a block diagram illustrating a dynamic IPNT display-to-queue sever relationship that utilizes queue monitoring for updating estimated-wait-time displays according to an embodiment of the present invention. As described in FIG. 1, IPS 29 maintains the appropriate IP queues for virtual calls. Server 24 stores the interactive display pages that are accessed by users from a hyperlink contained in one of the advertisement pages provided by server 23.

A virtual queue 59 is maintained in this example in ISP 29 and is adapted to hold virtual positions-in-queue such as are represented by icons 1–7, and a call-in-progress (CIP) icon A. Queue 59 may be, in a simple embodiment, an IPNT virtual queue holding positions for a single agent having an IPNT application adapted to communicate with the callers. In a slightly more complicated embodiment, queue 59 may be a virtual IPNT queue holding positions for a plurality of subscribing agents (shared queue).

In still another embodiment, queue 59 may be a combination real and virtual queue holding call positions and such as instant messages or the like representing call-response-requests covering a variety of IP communication media. Moreover, there may be more than one separate queue such as queue 59 maintained by IPS 29 without departing from the spirit and scope of the present invention. The inventor deems that the illustration of one such queue is sufficient for the purpose of explaining the present invention. Also, in embodiments implemented through connection to T-Server 22, the queues may be COST-call queues manipulated and managed by T-Server 22.

A queue monitor display 61 is provided to display parameters of queue 59 and/or other available queues and agent status. Parameters are provided through software 30*b* executing on server 29, or in other embodiments CTI applications operating in a T-server such as server 22. The main queue parameters that are of concern to callers include the current number of calls in queue, particularly calls ahead of an inquiring user, and the average time per call, which may be used to calculate an estimated response time for any particular call-position in queue 59, or any other queue, or similar parameters pertaining to availability of individual agents.

In addition to the above-described parameters, monitor 61 may also be used to determine other parameters such as may be associated with other queue types. For example, if queue 59 is a combination queue that is shared by a plurality of agents and contains IPNT positions and instant messages, then monitor 61 may be enabled to report the number of agent's currently working queue 59. Monitor 61 may also report how many IPNT positions compared to instant messages that exist in queue, as well as to report average disposal time of each type of media convention. There are many possible combinations.

Data about queue 59 that is collected and calculated to be displayed by monitor 61 is, in a preferred embodiment streamed to Web server 24 in Internet 13. Data containers such as data container 63 are provided and installed (embedded) in information pages that are held in server 24 and accessible to users. Data container 63 receives and plays back the appropriate data portion requested by a user. The data streams in near real-time such that the current status information is visible to a user accessing an information page. For example, data container 63 indicates in this example that there are 7 calls ahead of a user with an estimated wait of 14 minutes before a response will be received. This is based on an average time-per-call associated with CIPs (icon A) of approximately two minutes.

Data container 63 is also illustrated as containing a list of available options. The available options are presented to users as alternative media options for receiving responses from agents, or as additional live-connection links representing alternative methods of contact. In some cases these options may be other alternative live-connection links such as IP to COST connection over a network bridge, or perhaps interactive chat entrances. Although the available options are illustrated herein as residing inside of container 63, in actual practice, such options may also be provided elsewhere on the information page and not specifically inside container 63. This would depend in part on the nature of the option.

Container 63 is created in some embodiments using Java™ applets or Active X™. Such conventions are well known in the art and available to the inventor and others. Other techniques may also be employed such as the use of popular media players, or new media players created for the task of streaming the data. Java™ or Active X™ controls are also used in the queue and queue monitoring applications in preferred embodiments. A software module (algorithm not shown) for calculating estimated wait time from an average disposal-time-per-call value for calls in progress (CIP icon A) is provided and may be executed either at IPS 29 or at server 24. Statistical analysis data for average call disposal time and other averaged call parameters or attributes may be obtained from conventional software means used to monitor overall communication center performance. In some cases however, such capability may be included and specific to SW 30*b*.

Container 63 as illustrated herein is not meant to take up the entire real estate associated with an information page held in such as server 24. Rather, container 63 may be adapted to utilize only a small portion of such an interactive page. Available options, as previously described, may be provided and presented inside container 63 or elsewhere in an information page as previously described. Options include any interactive function by which a user may be empowered by an enterprise hosting an enhanced communication center such as center 15 of FIG. 1. For example, if a hosting company is a mortgage company, then queue 59 may contain virtual IPNT positions representing callers checking to see if their individual loans were approved. A link activated for that purpose may be embedded in a start page such as a user's home mortgage page held in such as server 23 of FIG. 1.

In a preferred embodiment, initiated by invoking the contact link, an information page from server 24 is presented in the user's browser-interface window. Container 63 would then be visible displaying the parameters of queue 59. In one embodiment, a user actually places an IP call by invoking the previously-described call link thereby establishing a position in queue so that data in container 63 may be calculated according to his virtual position. Then, based on the user's evaluation of data presented in container 63, he or she may decide to stay in queue 59 and wait for an IP response from an agent, or use other available options. One such option may include such as terminating his or her position in queue and initiating communication by another method, or retaining his or her position in queue but changing the response directive concerning a desired response media to an answering agent.

In another embodiment, the queue parameters from such as queue 59 indicate queue activity based on the assumption that the user has not yet retained a position in queue. In this case, the data will reflect a maximum wait time based on all of the calls or call positions currently in queue. After user evaluation of the data, he or she may choose from the available options as described above, which may include making an IP call or initiating communication via any other supported media. Instant message fields may be provided for a user to enter parameters concerning a desired response such as media type, preferred time to call, IP address of receiving device, telephone number (if PSTN), cellular number (if mobile phone), e-mail address for an e-mail response requested, and so on. If such message fields are outside of container 63 then the appropriate linking may be performed to associate the instant message to an appropriate virtual queue position belonging to the requesting user.

The software of the present invention represented by SW 30*a* and SW 30*b* of FIG. 1 is preprogrammed and administered according to the type of enterprise using the software and the types of media supported at the enterprise communication center. In one embodiment container 63 may comprise an entire interactive Web-information page. In another embodiment it may comprise only a small viewable portion of an information page that is otherwise filled with linked instant-message fields and additional general informative or instructional content.

It will be apparent to one with skill in the art that the method and apparatus of the present invention may be utilized with various integrated architectures that may be implemented in a communication center without departing from the spirit and scope of the present invention. For example, SW 30a and b may be adapted to work in a communication center wherein all incoming communication is pure IPNT or in one that supports COST converted to IPNT and pure IPNT, or in one that supports COST calls only. In the embodiment presented in FIG. 1, communication center 15 supports COST and IPNT separately. There are many possible implementations.

Figure 3:
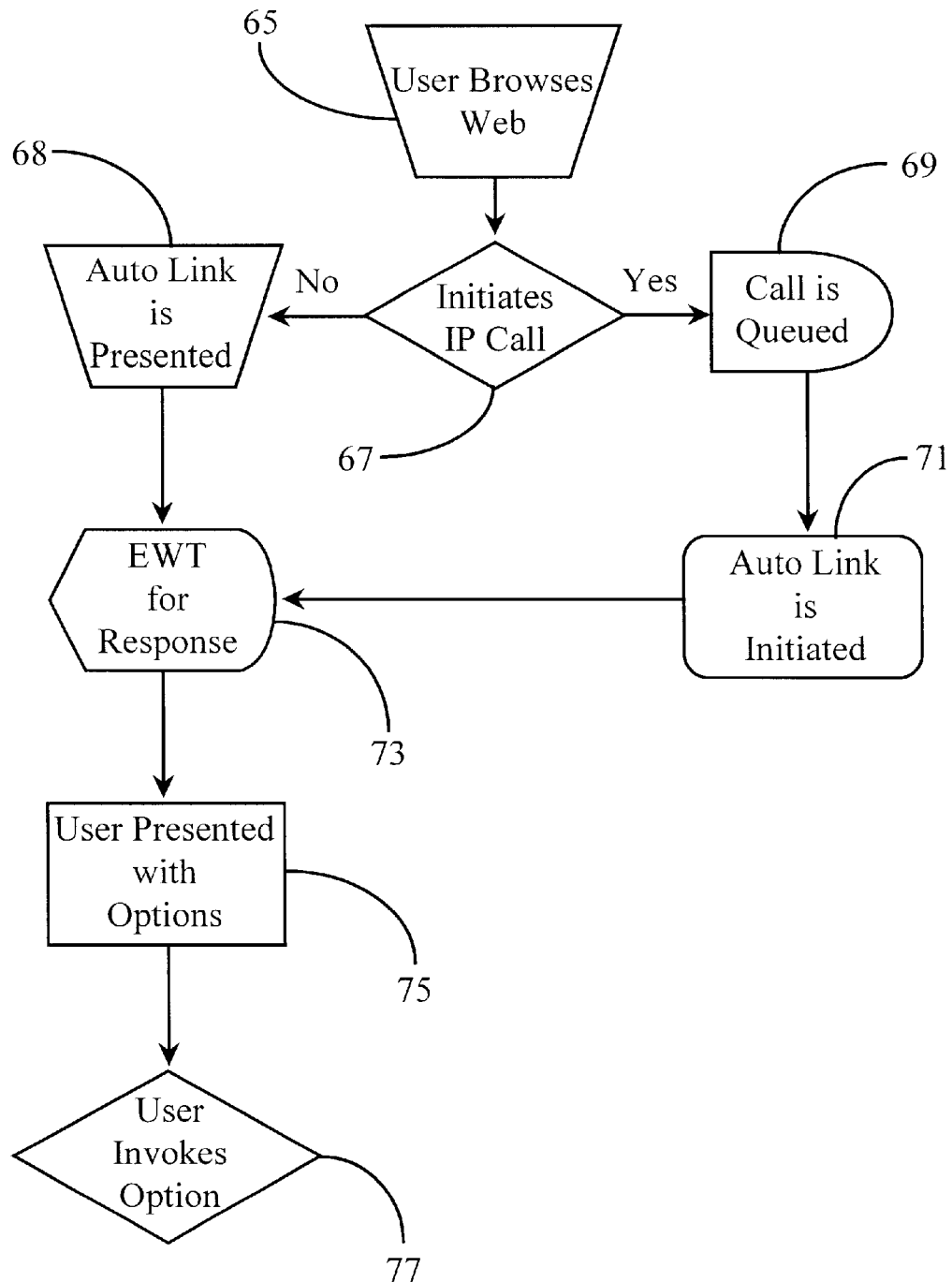
FIG. 3 is a process flow chart illustrating logical process steps used to administer the estimated-wait-time in a communication center environment according to an embodiment of the present invention.

FIG. 3 is a process flow chart illustrating logical process steps used in interaction with an EWT application in a communication center environment according to an embodiment of the present invention. At step 65, a user initiates a browsing session on the Internet or another type of data-packet network. During this session, it is assumed that he or she will visit a Web page in a server such as server 23 of FIG. 1 that contains an automated-contact hyperlink to a hosting communication center such as center 15 of FIG. 1.

At step 67, a user makes a decision whether or not to initiate an automated communication link, which is in this example, an IP telephony link. If the decision in step 67 is yes and the link is activated, an IP call is initiated from the user to communication center 15 (FIG. 1) and queued in such as queue 59 of FIG. 2. It is assumed for this example process that there are no agents available to immediately answer the user's placed IP call. Therefore the call is virtually represented and queued as described in step 69. The user receives notification that agents are busy and his original call attempt is terminated once his virtual queue position is established.

At step 71, an automated hyperlink is invoked on the user's behalf that causes his or her browser application to navigate to an information page such as one held in server 24 of FIG. 1. At step 73, the user downloads the information-page and a calculated EWT for response (and in many cases other information) and this information is presented to the user in such as container 63 of FIG. 2.

The information page will include container 63 and optionally other media options, which are presented to the user in step 75. In step 77 the user decides whether or not to invoke one of the other options. If queue 59 is low, perhaps only a few minutes for response time, then a user may elect to simply wait for an IP-call response from an agent. If queue 59 is full and wait time is significant, a user may choose to invoke another media option instead of placing an IP call.

At step 67, if a user chooses not to invoke an automatic contact link, he may instead connect to an associated information page including data container 63 (FIG. 2) (step 68). By giving users access to an information page associated with a particular contact link such as presenting the links side by side, a user may see current queue status before invoking any contact options. However, he or she will not have a position retained in the associated queue until a contact option is invoked. Therefore, any real-time data viewed by the user will be maximized in terms of wait time to reflect all positions currently in the queue. If many positions are being established at a rapid rate, it may be advisable for the user to first grab a position and then view status.

The information page including data container 63 is presented in step 73, options are presented in step 75, which may include invoking the original contact link in order to retain a position in queue, and step 77 covers user activation of a presented option as previously described.

It will be apparent to one with skill in the art that the interaction process steps illustrated herein may be of a different number and order without departing from the spirit and scope of the present invention. For example, subroutines may be included as well as routines added or deleted from the overall process. The actual interaction order may depend on many variables such as the type of enterprise for which the process is created, the scope of equipment and network architecture on which the process will be executed, and so on. The inventor intends that the steps illustrated above comprise only one exemplary sequence of many possible process options.

The method and apparatus of the present invention may be used in conjunction with any IP-capable communication-center environment including one in which there are many communication centers employing agents that are linked to a same network.

In an alternative embodiment, the method and apparatus of the present invention may be scaled down for small business or recreational use wherein servers in the network are used to forge connections instead of having an IP-capable switch. For example, a user of an IP phone application such as Netmeeting™ may subscribe to a service offering a virtual queue capability that employs the aspects of the present invention for the purpose of letting callers to the user know of their various options. Such an application may be useful to a business person operating a Web-based operation wherein there are significant calls coming in from customers and associates.

The method and apparatus of the present invention should be afforded the broadest possible scope in lieu of the many possible embodiments, both in business and personal use that have been described. The spirit and scope of the present invention is limited only by the claims that follow.

What is claimed is:

1. An Estimated Wait Time (EWT) service for a Web page provider, comprising:

an internet-connected facility for monitoring communication status with a communication center having communication equipment hosting agents of the web page provider; and an interactive link in a web page hosted by the Web page provider, the interactive link presented to a user accessing the Web page, and when selected, connecting the user to the facility for monitoring communication status.

2. The service of claim 1 wherein the Web page having the hyperlink further comprises a user interface enabled to display parameters of the communication status.

3. The service of claim 1 wherein the communication status comprises estimated wait time (EWT) in at least one communication queue at the communication center for communication with an enterprise agent.

4. The service of claim 2 wherein the user interface comprises a call hyperlink, which when selected places an Internet-protocol network telephony (IPNT) call to the communication center on behalf of the user.

5. The service of claim 4 wherein selecting the call hyperlink placing the IPNT call to the communication center also invokes the URL for the web page including the communication status.

6. The service of claim 1 wherein the user interface comprises optional interactive links for the user to select and initiate alternative media communication with enterprise agents at the communication center, including one or more of voice message, e-mail, or request for call back.

7. The service of claim 6 wherein a request for call back includes a facility for the user to specify one of both of a telephony number or address and a time for the call back to be made.

* * * * *